(12) United States Patent
Sakamoto et al.

(10) Patent No.: US 11,034,466 B2
(45) Date of Patent: Jun. 15, 2021

(54) LANDING GEAR OF AIRCRAFT AND AIRCRAFT COMPRISING LANDING GEAR

(71) Applicant: KAWASAKI JUKOGYO KABUSHIKI KAISHA, Kobe (JP)

(72) Inventors: Fuminobu Sakamoto, Kakamigahara (JP); Toyotoshi Kurose, Nagoya (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 721 days.

(21) Appl. No.: 15/703,202

(22) Filed: Sep. 13, 2017

(65) Prior Publication Data

US 2018/0072437 A1  Mar. 15, 2018

(30) Foreign Application Priority Data

Sep. 13, 2016  (JP) .............................. JP2016-178270

(51) Int. Cl.
*B64G 1/62* (2006.01)
*F16F 7/12* (2006.01)

(52) U.S. Cl.
CPC ................ *B64G 1/62* (2013.01); *F16F 7/121* (2013.01)

(58) Field of Classification Search
CPC ............ B64G 1/62; B64C 25/64; B64C 25/05
See application file for complete search history.

(56) References Cited

U.S. PATENT DOCUMENTS

| 3,466,733 | A | * | 9/1969 | Barsam | F16F 7/122 |
| | | | | | 29/896.93 |
| 5,366,181 | A | * | 11/1994 | Hansen | B64G 1/22 |
| | | | | | 188/381 |
| 2015/0291292 | A1 | * | 10/2015 | Courier | B64G 1/58 |
| | | | | | 244/171.7 |

FOREIGN PATENT DOCUMENTS

| JP | S61-196846 A | 9/1986 |
| JP | 2002-205698 A | 7/2002 |
| JP | 2012-1044 A | 1/2012 |
| JP | 2012-107660 A | 6/2012 |
| JP | 2016-161123 A | 9/2016 |

* cited by examiner

*Primary Examiner* — Jessica B Wong
(74) *Attorney, Agent, or Firm* — Oliff PLC

(57) ABSTRACT

A landing gear of an aircraft of the present invention, includes a core section with a honeycomb structure, including a plurality of cell walls and a plurality of cell holes defined by the plurality of cell walls; a cover section which covers the core section; and a hole provided in the core section to absorb an impact, the hole having a diameter larger than that of the plurality of cell holes and extending in an extending direction of the plurality of cell holes.

10 Claims, 7 Drawing Sheets

LANDING GEAR OF AIRCRAFT AND AIRCRAFT COMPRISING LANDING GEAR

BACKGROUND OF THE INVENTION

1. Field of the Invention

The present invention relates to a landing gear of an aircraft (air vehicle) used during landing, and the aircraft comprising the landing gear.

2. Description of the Related Art

For example, as an aircraft including a landing gear of an aircraft which lands on an astronomical body such as a moon and a planet, an astronomical probe vehicle is known. The landing gear of the astronomical probe vehicle as the aircraft includes an outer tube fixed to the lower surface of a body, and a tip end portion which is fittingly and slidably inserted into the outer tube. A honeycomb core for absorbing an impact during landing is inserted into the outer tube. A grounding portion with a disc shape is provided at the tip end of the tip end portion (e.g., Japanese Laid-Open Patent Application Publication No. 2002-205698).

SUMMARY OF THE INVENTION

The landing gear of the aircraft disclosed in the above-described Patent Literature 1 includes the outer tube, the tip end portion, the honeycomb core, and the grounding portion, and the tip end portion is slidable relative to the outer tube. Therefore, the structure of the landing gear is complex.

A landing point (place) may be sometimes a hard rock ground, or soft ground such as regolith. Further, the landing point may be bumpy (uneven) ground, or the like. In a case where the astronomical probe vehicle lands on the landing point with bumps and a rigid body with the disc shape is grounded on the landing point, the astronomical probe vehicle is likely to be tilted and fall down due to the bumps. In another case where the astronomical probe vehicle lands on the soft ground, it is necessary to increase the length of the landing gear to prevent the astronomical probe vehicle from sinking into the soft ground. This increases the mass (weight) of the landing gear. If the astronomical probe vehicle lands on the rock ground or the like, with the landing gear with an increased length, the astronomical probe vehicle is likely to fall down in a case where the landing gear lands on the rock ground or the like, because the center of gravity of the astronomical probe vehicle is high. In contrast, if the size of the grounding portion is increased, it becomes possible to suppress the astronomical probe vehicle from sinking into the soft ground. However, if the area of the grounding portion with the disc shape is increased, the weight of the landing gear of the aircraft is increased, and the grounding portion is more likely to land on the bumps.

The present invention is directed to solving the above-described problem, and an object of the present invention is to provide a landing gear of an aircraft having a simple and lightweight structure which allows the landing gear to more reliably land on a landing point (place), irrespective of a state of the landing point, and the aircraft comprising the landing gear.

According to an aspect of the present invention, there is provided a landing gear of an aircraft, the landing gear comprising: a core section with a honeycomb structure, including a plurality of cell walls and a plurality of cell holes defined by the plurality of cell walls; a cover section which covers the core section; and a hole provided in the core section to absorb an impact, the hole having a diameter larger than that of the plurality of cell holes and extending in an extending direction of the plurality of cell holes.

In accordance with this configuration, since the landing gear includes the core section and the cover section, its structure is simple. Since the core section has the honeycomb structure and includes the hole, the core section can absorb collision energy, the weight of the landing gear can be reduced, and the grounding area of the landing gear can be increased. The gear bottom section can be deformed according to the shape of a bump of the ground. In this configuration, in a case where the landing gear lands on a hard landing point (place), the honeycomb core absorbs energy, and thereby break or fracture of the landing gear due to an impact during landing can be prevented. Also, in a case where the landing gear lands on a soft landing point (place), it becomes possible to prevent the landing gear from sinking into soft ground.

In the landing gear of the aircraft, the core section may include a body provided with the hole and a core bottom section provided between a bottom of the hole and a bottom surface of the core section. In accordance with this configuration, even in a case where the landing gear lands on the landing point (place) with a bump, the core section is deformed according to the shape of the bump. This allows the landing gear to stably land on the landing point.

In the landing gear of the aircraft, the core section may have a shape in which a cross-sectional area in a direction perpendicular to the extending direction of the plurality of cell holes increases from a bottom surface of the core section toward a top surface of the core section. In accordance with this configuration, a portion of the core section, which has a greater cross-sectional area, bears a shearing force and a bending moment in the direction perpendicular to the extending direction of the cell holes. Therefore, break or fracture of the landing gear can be prevented.

In the landing gear of the aircraft, the core section may be a first core section, and the landing gear may further comprise: a second core section placed on a top surface of the first core section; and a plate section interposed between the first core section and the second core section. In accordance with this configuration, since the second core section is placed on the first core section, the vertical length of the landing gear can be increased. In addition, a pressure transmitted from the first core section to the second core section is made uniform by the plate section, and break or fracture of the landing gear can be prevented. Further, the plate section supports the first cell walls and the second cell walls, and thus deformation of the first cell walls and the second cell walls, due to the shearing force and the bending moment, can be suppressed.

In the landing gear of the aircraft, the plurality of cell walls may be a plurality of first cell walls, and the plurality of cell holes may be a plurality of first cell holes, and the second core section may have a honeycomb structure, including a plurality of second cell walls and a plurality of second cell holes defined by the plurality of second cell walls. In accordance with this configuration, the weight of the landing gear can be reduced by the second core section with the honeycomb structure.

In the landing gear of the aircraft, the hole may be a first hole, and the second core section may include a second hole extending between a top surface of the second core section and a bottom surface of the second core section. In accordance with this configuration, the weight of the landing gear can be further reduced.

In the landing gear of the aircraft, the second core section may have a shape in which a cross-sectional area in a direction perpendicular to an extending direction of the plurality of second cell holes increases from the bottom surface of the second core section toward the top surface of the second core section. In accordance with this configuration, a portion of the second core section, which has a greater cross-sectional area, bears a shearing force and a bending moment in the direction perpendicular to the extending direction of the second cell holes. Therefore, break or fracture of the landing gear can be prevented.

According to another aspect of the present invention, there is provided an aircraft comprising the above-described landing gear. In accordance with this configuration, the aircraft has a simple and lightweight structure. The aircraft can more reliably land on the landing point (place) irrespective of a state of the landing point.

According to a further aspect of the present invention, there is provided an aircraft comprising: the above-described landing gear; and a bracket provided in such a manner that the second core section is interposed between the bracket and the plate section, and the plate section, the second core section, and the bracket may constitute a honeycomb sandwich structure. In accordance with this configuration, a pressure transmitted from the first core section and the second core section to the aircraft is made uniform by the plate section and the bracket, and break or fracture of the aircraft can be prevented. Further, the plate section and the bracket support the first cell walls and the second cell walls, and thus deformation of the first cell walls and the second cell walls, due to the shearing force and the bending moment, can be suppressed.

The present invention has the above-described configuration, and can obtain an advantage that it becomes possible to provide a landing gear of an aircraft having a simple and lightweight structure which allows the landing gear to more reliably land on a landing point (place), irrespective of a state of the landing point, and the aircraft comprising the landing gear.

The above and further objects, features and advantages of the present invention will more fully be apparent from the following detailed description of preferred embodiment with reference to accompanying drawings.

DETAILED DESCRIPTION OF THE PREFERRED EMBODIMENTS

Hereinafter, the embodiments of the present invention will be described specifically with reference to the drawings. Throughout the drawings, the same or corresponding constituents are designated by the same reference symbols and will not be described in repetition.

Embodiment 1

Figure 1A:
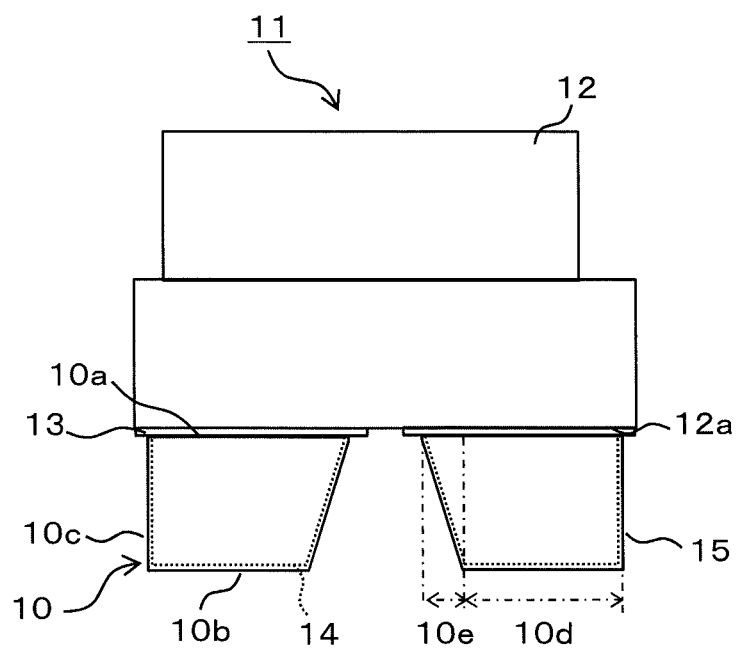
FIG. 1A is a perspective view schematically showing an aircraft (air vehicle) including landing gears of the aircraft according to Embodiment 1 of the present invention.
Figure 1B:
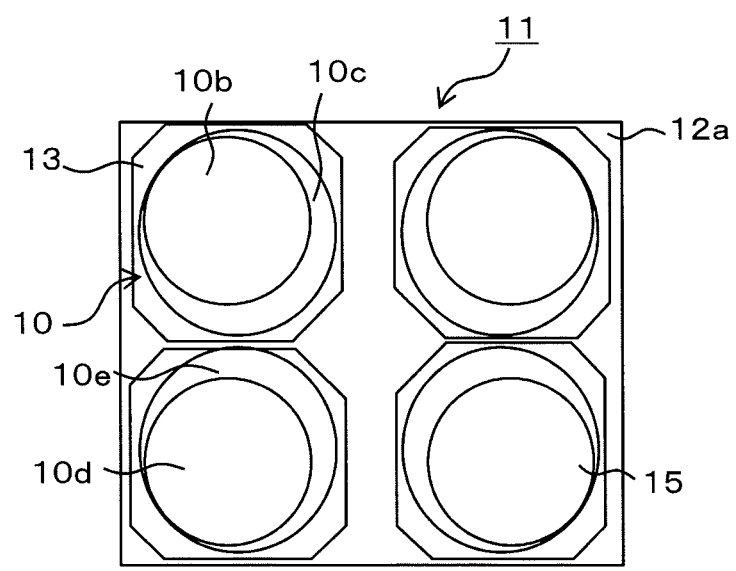
FIG. 1B is a bottom view of the aircraft of FIG. 1A.

The configuration of an aircraft (air vehicle) 11 including landing gears 10 according to Embodiment 1 will be described with reference to FIGS. 1A and 1B. Although in Embodiment 1 the landing gears 10 are applied to the aircraft 11, the aircraft 11 is not limited to a landing aircraft. For example, the aircraft 11 may be an aircraft such as a spacecraft which flies in a cosmic space outside aerosphere, or an airship which flies in the aerosphere.

The aircraft 11 includes a body 12 and landing gears 10. The body 12 has a flat bottom surface (body bottom surface) 12a having, for example, a rectangular shape. One or a plurality of (four in the present embodiment) landing gears 10 is/are mounted on the body bottom surface 12a. For example, the landing gears 10 are disposed at corners of the body bottom surface 12a. The landing gears 10 are fastened to the body bottom surface 12a by brackets 13, respectively (FIG. 3). The brackets 13 are flat plates. The brackets 13 are formed of a material which is light in weight and has high strength, for example, a resin such as a carbon fiber reinforced plastic.

Each of the landing gears 10 includes a top surface (gear top surface) 10a facing the body bottom surface 12a, a bottom surface (gear bottom surface) 10b opposite to the gear top surface 10a, and a side surface (gear side surface) 10c provided between the gear top surface 10a and the gear bottom surface 10b. Each of the landing gears 10 has a circular truncated cone shape (frustum of circular cone). It should be noted that the shape of the landing gear 10 is not limited to the circular truncated cone, and may be a truncated frustum such as a truncated pyramid (frustum of pyramid).

In each of the landing gears 10, a portion of the gear side surface 10c which is on the corner side of the body bottom surface 12a extends vertically upward from the gear bottom surface 10b. In contrast, a portion of the gear side surface 10c which is other than the portion of the gear side surface 10c which is on the corner side of the body bottom surface 12a is inclined with respect to the gear bottom surface 10b in such a manner that the cross-sectional area of the landing gear 10 increases in a direction from the gear bottom surface 10b toward the gear top surface 10a.

Each of the landing gears 10 includes, in a direction parallel to the gear top surface 10a, a portion (gear body section) 10d with a circular cylinder (columnar) shape which is between the gear bottom surface 10b and the gear top surface 10a, and a portion (gear support section) 10e which is between the gear side surface 10c and the gear top surface 10a. The gear support section 10e surrounds the gear body section 10d in a region other than the portion on the corner side of the body bottom surface 12a and protrudes outward from the gear body section 10d.

Each of the landing gears 10 includes a first core section 14, and a cover section 15. The cover section 15 covers the bottom surface (first bottom surface) and side surface (first side surface) of the first core section 14, to protect the first core section 14 and prevent ingress of dirt or the like into the first core section 14. The cover section 15 has characteristics such as high resistances to heat, cold, wear and abrasion, and lightweight. The cover section 15 is made of a resin such as a polyimide resin, and formed by a film.

Next, the first core section 14 will be described with reference to FIGS. 2A to 2E. The first core section 14 includes a top surface (first core top surface) 14a, a first core bottom surface 14b opposite to the first core top surface 14a, and a first core side surface 14c provided between the first core top surface 14a and the first core top surface 14a.

Figure 2A:
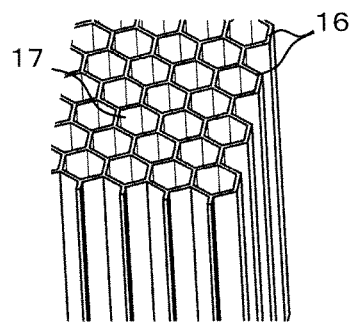
FIG. 2A is a perspective view showing first cell walls and first cell holes.
Figure 2B:
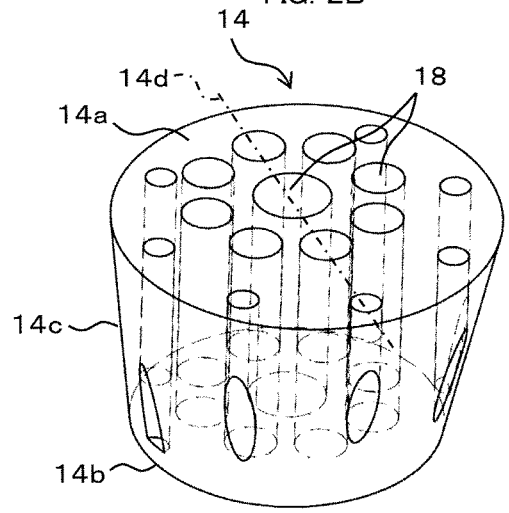
FIG. 2B is a perspective view showing a first core section.

As shown in FIG. 2A, the first core section 14 includes a number of cell walls (first cell walls) 16 and a number of cell holes (first cell holes)17, and has a honeycomb structure.

The first cell walls 16 are formed of a thin plate member made of a lightweight and deformable material. For example, as the first cell walls 16, metal, a resin, ceramic, or the like is used. Among these, metal which is plastically deformable is preferably used. Lightweight aluminum is more preferably used.

The first cell walls 16 extend in a flat shape in a direction perpendicular to the first core bottom surface 14b. The first cell walls 16 are bent or curved in a direction parallel to the first core bottom surface 14b to form a tubular shape having an inner space. This space is formed as each of the first cell holes 17.

Each of the first cell holes 17 is a space defined (surrounded) by the first cell walls 16, and has, for example, a hexagonal cylinder shape. Each of the first cell holes 17 extends between the first core top surface 14a and the first core bottom surface 14b of the first core section 14, penetrates the first core section 14, and opens in the first core top surface 14a and the first core bottom surface 14b. The plurality of first cell holes 17 extend in parallel with each other. The first cell holes 17 are uniform in size and shape in a direction perpendicular to the extending direction of the first cell holes 17. The shape of the first cell holes 17 is not limited to the hexagonal cylinder, and may be another polygonal cylinder, or a substantially circular cylinder.

The first core section 14 has a circular truncated cone shape (frustum of circular cone). The cross-section of the first core section 14 which is taken in the direction perpendicular to the extending direction of the first cell holes 17 has, for example, a circular shape. The cross-sectional area of the first core section 14 increases along the extending direction of the first cell holes 17, from the first core bottom surface 14b toward the first core top surface 14a. It should be noted that the shape of the first core section 14 is not limited to the circular truncated cone, and may be a truncated frustum such as a truncated pyramid (frustum of pyramid).

Figure 2C:
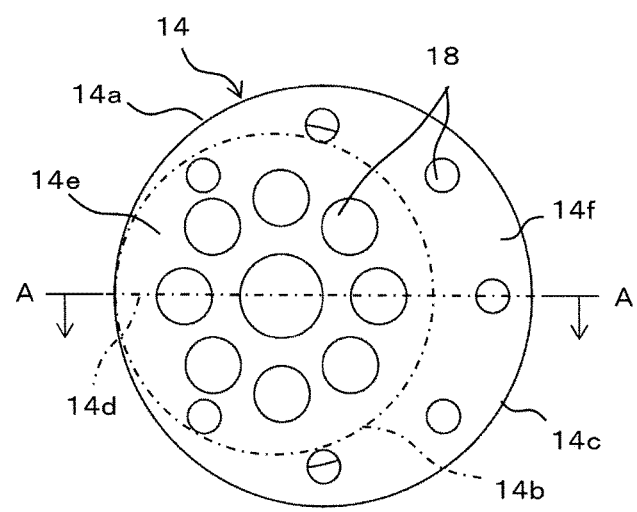
FIG. 2C is a top plan view showing the first core section.
Figure 2D:
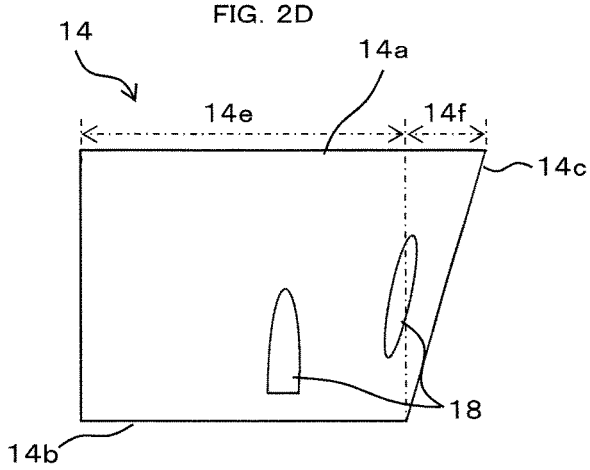
FIG. 2D is a side view of the first core section.

The first core section 14 may be line-symmetric (linearly symmetric) with respect to a first core symmetry line 14d extending through the first core top surface 14a and the first core bottom surface 14b. As shown in FIGS. 2C and 2D, a first portion of the first core side surface 14c including the first core symmetry line 14d extends vertically upward from the first core bottom surface 14b, and the remaining portion of the first core side surface 14c is inclined with respect to the first core bottom surface 14b.

As should be understood from the above, the first core section 14 includes in the direction parallel to the first core top surface 14a, a portion (first core body section) 14e with the circular cylinder shape, between the first core bottom surface 14b and the first core top surface 14a, and a portion (first core support section) 14f between the first core side surface 14c and the first core top surface 14a. The first core body section 14e constitutes the gear body section 10d of the landing gear 10. The first core support section 14f is provided to surround the first core body section 14e except the first portion, and constitutes the gear support section 10e of the landing gear 10.

Figure 2E:
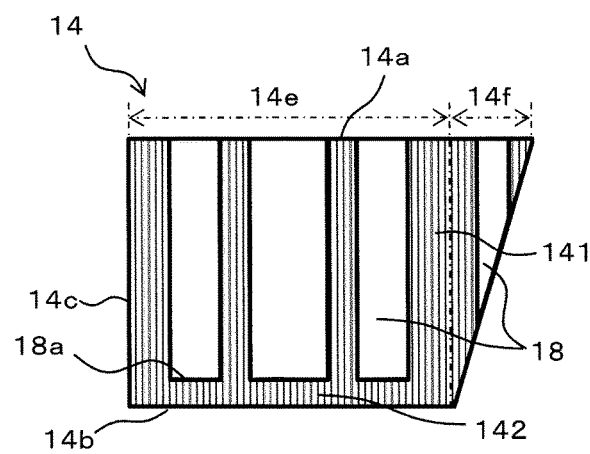
FIG. 2E is a cross-sectional view taken along line A-A of FIG. 2C.

As shown in FIG. 2E, the first core section 14 includes, in the direction perpendicular to the first core top surface 14a, a core body 141 provided with holes (first holes)18 described later, and a core bottom section 142 provided between the bottoms (first hole bottom surfaces) 18a of the first holes 18 and the first core bottom surface 14b.

Each of the first holes 18 has a diameter larger than that of the first cell hole 17. In other words, the cross-sectional area of the first hole 18 which is taken along the direction perpendicular to the extending direction of the first cell holes 17 is larger than that of the first cell hole 17.

One or a plurality of (16 in the present embodiment) first holes 18 are provided in the first core section 14. The plurality of first holes 18 may be disposed to be line-symmetric with respect to the first core symmetric line 14d. The first holes 18 extend from the first core top surface 14a toward the first core bottom surface 14b. For example, the first holes 18 extend in parallel with the first cell holes 17 along the extending direction of the first cell holes 17.

The first holes 18 disposed in a region between the first core side surface 14c and the first core top surface 14a (the first core support section 14f) penetrate the first core support section 14f from the first core top surface 14a to the first core side surface 14c.

The first holes 18 disposed in a region between the first core bottom surface 14b and the first core top surface 14a (the first core body section 14e) are depressed from the first core top surface 14a. These first holes 18 do not penetrate the first core body section 14e from the first core top surface 14a to the first core bottom surface 14b, and the core bottom section 142 exists between the first hole bottom surfaces 18a and the first core bottom surface 14b. In this structure, the first cell walls 16 (the core bottom section 142) are provided between the first hole bottom surfaces 18a and the first core bottom surface 14b. The first cell walls 16 may be uniformly arranged in the whole of the first core bottom surface 14b. In this case, a force is uniformly applied to the first cell walls 16 in the first core bottom surface 14b during landing of the landing gear 10. A collision load applied to the aircraft 11 is suppressed as a whole by the first cell walls 16. As a result, break or fracture of the aircraft 11 can be prevented.

Figure 3A:
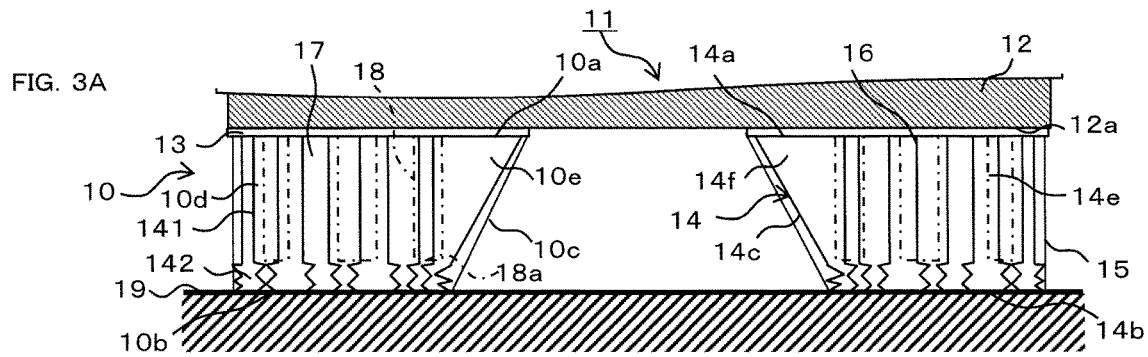
FIG. 3A is a view showing a state in which landing gears land on a landing point (place) which is hard and flat.

Next, the operation of the landing gears 10 of the aircraft 11 during landing of the aircraft 11 will be described with reference to FIGS. 3A to 3D. As shown in FIG. 3A, it is assumed that the aircraft 11 lands on a landing point (place) 19 in such a manner that the first core bottom surfaces 14b are parallel to the landing point 19. The landing point 19 is hard and flat. The landing point 19 extends in the direction perpendicular to the extending direction of the first cell holes 17.

In this case, the whole of the gear bottom surface 10*b* of each of the landing gears 10 uniformly contacts the landing point 19. The collision load generated at this time acts on the first core section 14 in the extending direction of the first cell holes 17 and the first cell walls 16. By the collision load, the first cell walls 16 which are close to the first core bottom surfaces 14*b* are deformed and buckled to absorb the collision energy of the landing gear 10. This makes it possible to reduce the collision load transmitted to the aircraft 11 by the first cell walls 16, and break or fracture of the aircraft 11 is prevented.

In this case, because of the presence of the first cell holes 17 and the first holes 18, the cross-sectional area of each of the landing gears 10 is reduced, and a pressure applied to the aircraft 11 via the first core top surface 14*a* during a collision can be reduced. Therefore, break or fracture of the aircraft 11 can be prevented.

Since the first cell walls 16 are easily deformed because of the first holes 18, a deformation load of the landing gear 10 can be reduced. This makes it possible to mitigate a force transmitted to the aircraft 11 by the first cell walls 16. As a result, a collision load received by the aircraft 11 can be reduced.

Since the first cell walls 16 made of metal or the like are plastically deformed, each of the landing gears 10 does not bounce. This makes it possible to prevent the aircraft 11 from falling down due to the collision load. Since the cover sections 15 are made of a material having no elasticity, an elastic force with respect to the collision load is not generated. This makes it possible to more effectively prevent the aircraft 11 from falling down.

Each of the first core sections 14 is covered by the cover section 15. In this structure, if hard objects such as rocks come off the ground and collide with the gear side surface 10*c* of each of the landing gears 10 due to, for example, influence of the collision, the gear side surface 10*c* is protected by the cover section 15. Therefore, it becomes possible to prevent break or fracture of the first cell walls 16 which have a lower resistance to an external force applied from the gear side surface 10*c* side than from the gear bottom surface 10*b* side.

Figure 3B:
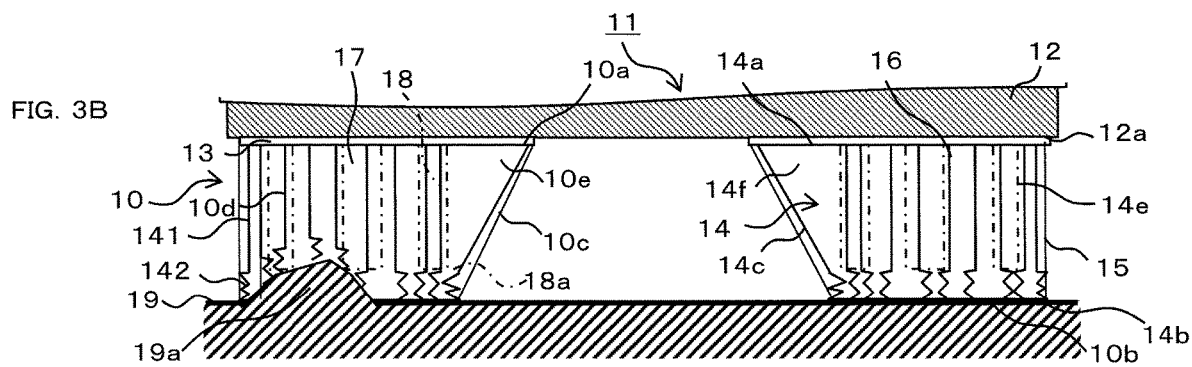
FIG. 3B is a view showing a state in which the landing gears land on a landing point which is hard and flat and has a bump.

As shown in FIG. 3B, in a case where the aircraft 11 lands on a hard landing point 19 with a bump 19*a*, the bump 19*a* contacts a portion of the gear bottom surface 10*b* of the landing gear 10, and the first cell walls 16 which have collided with the bump 19*a* are deformed. Then, the remaining portion of the gear bottom surface 10*b* contacts the landing point 19, and the first cell walls 16 close to the first core bottom surface 14*b* are deformed due to the collision load. By buckling of the first cell walls 16, the collision energy of the landing gear 10 is absorbed. Thus, since the core bottom section 142 of the first core section 14 which is easily deformable is provided over the entire of each of the landing gears 10, the core bottom section 142 is deformed according to the shape of the bump 19*a* of the landing point 19. This makes it possible to suppress tilting of the landing gear 10 and the aircraft 11. As a result, it becomes possible to prevent the aircraft 11 from falling down due to the bump 19*a*.

Figure 3C:
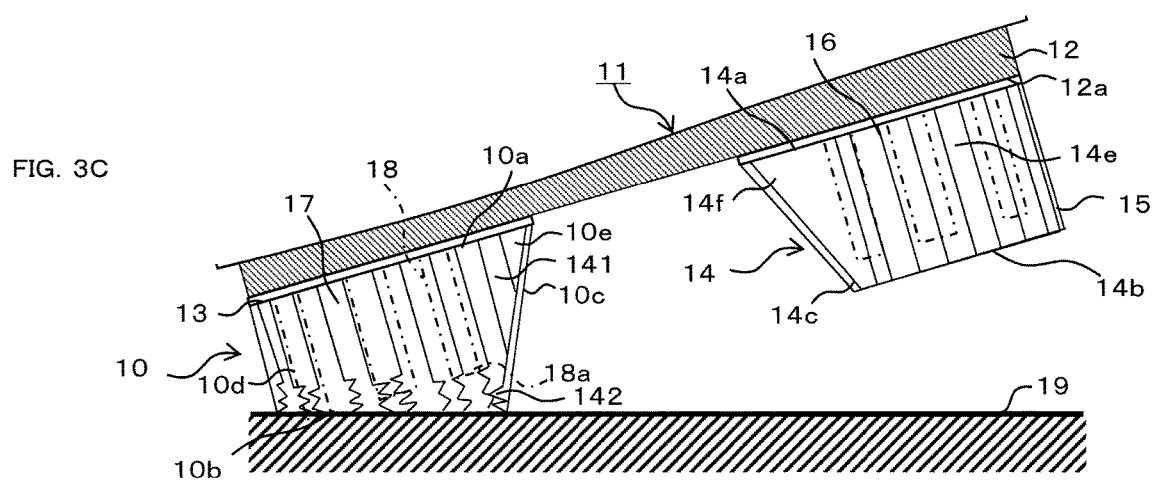
FIG. 3C is a view showing a state in which the landing gears land in a tilted state on a landing point which is hard and flat.

As shown in FIG. 3C, it is assumed that the aircraft 11 lands in a tilted state on the landing point 19 which is hard and flat. In this case, the first cell walls 16 which have collided with the landing point 19 and the first cell walls 16 which are in the vicinity of the first cell walls 16 which have collided are deformed. By the deformation of the first cell walls 16, collision energy of the landing gear 10 is absorbed. Therefore, even in a case where the extending direction of the first cell walls 16 is oblique with respect to the landing point 19, further tilting of the landing gear 10 and the aircraft 11 is suppressed. This makes it possible to prevent the aircraft 11 from falling down due to the bump 19*a*.

This collision load acts on the first core section 14 in an oblique direction with respect to the extending direction of the first cell holes 17 and the first cell walls 16. A bending moment and a shearing force due to this oblique load increase as they are away from the first core bottom surface 14*b* which collides with the landing point 19. Since the cross-sectional area of the first core section 14 increases in the direction from the first core bottom surface 14*b* toward the first core top surface 14*a*, break or fracture of the first core section 14 due to the bending moment and the shearing force can be prevented by the first core support section 14*f*.

In particular, when each of the landing gears 10 collides with the landing point 19, a force acts on the landing gear 10, in a direction from an outer side of an airframe (fuselage) toward an inner side thereof. Each of the landing gears 10 has a shape in which the gear side surface 10*c* which is adjacent to another gear side surface 10*c* (on the located inner side of the airframe) is inclined to the inner side of the airframe so that the cross-sectional area of the landing gear 10 increases from the gear bottom surface 10*b* toward the gear top surface 10*a*. In this structure, the gear support sections 10*e* on the inner side of the airframe bear the collision load acting on the landing gears 10 in the direction from the outer side of the airframe toward the inner side of the airframe. This makes it possible to more reliably prevent break or fracture of each of the landing gears 10 due to the bending moment and the shearing force.

Figure 3D:
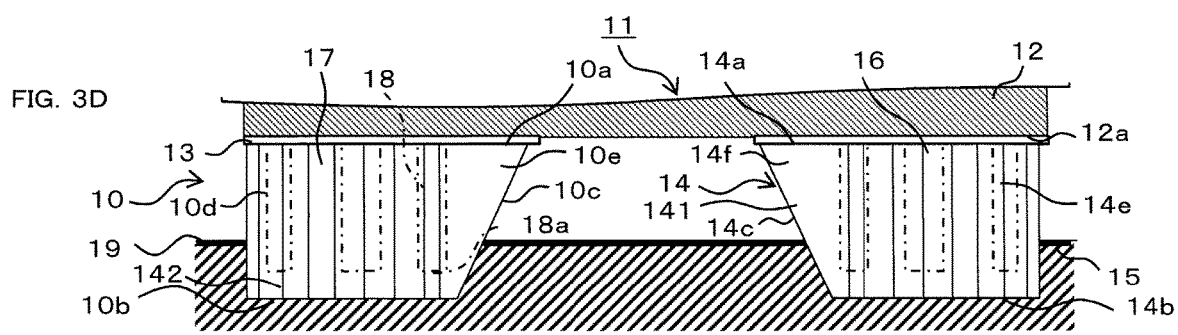
FIG. 3D is a view showing a state in which the landing gears land on a landing point which is soft regolith.

As shown in FIG. 3D, it is assumed that the aircraft 11 lands on the landing point 19 which is soft regolith. In this case, the landing gears 10 sink into the regolith and can absorb the collision energy of the landing gears 10. Since the area of each of the first core bottom surfaces 14*b* can be increased, sinking of each of the landing gears 10 into the regolith can be reduced. Since the first core bottom surface 14*b* is covered by the cover section 15, the regolith does not enter the first cell walls 17 and the first holes 18. This makes it possible to more reliably reduce sinking of the landing gears 10 into the regolith. Since it is not necessary to increase the length of the landing gears 10, the mass of the landing gears 10 does not increase, the center of gravity of the aircraft 11 is not high, and falling of the aircraft 11 can be prevented.

In accordance with the above-described configuration, since each of the landing gears 10 includes the first core section 14 and the cover section 15, the configuration of the landing gear 10 is simple. Since the first core section 14 has the honeycomb structure and is provided with the first holes 18, the weight of each of the landing gears 10 can be reduced. Further, the first core section 14 is provided with the first holes 18 for absorbing an impact, which have a diameter larger than that of the first cell holes 17 and extend in the extending direction of the first cell holes 17. This allows each of the landing gears 10 to reliably land on the landing point 19 irrespective of a state of the landing point 19.

The first core section 14 includes the core body 141 provided with the first holes 18, and the core bottom section 142 provided between the first hole bottom surfaces 18*a* and the bottom surface (first core bottom surface)14*b* of the first core section 14. Since the core bottom section 142 is deformed according to the shape of the landing point 19 with the hard bump 19a, each of the landing gears 10 can more stably land on the landing point 19.

The cross-sectional area of the first core section 14 which is taken along the direction perpendicular to the extending direction of the first cell holes 17 increases from the first core bottom surface 14b toward the first core top surface 14a. With this shape, even in a case where the bending moment and the shearing force due to the oblique load acts on each of the landing gears 10, the gear support section 10e can prevent the break or fracture of each of the landing gears 10.

Embodiment 2

Figure 4A:
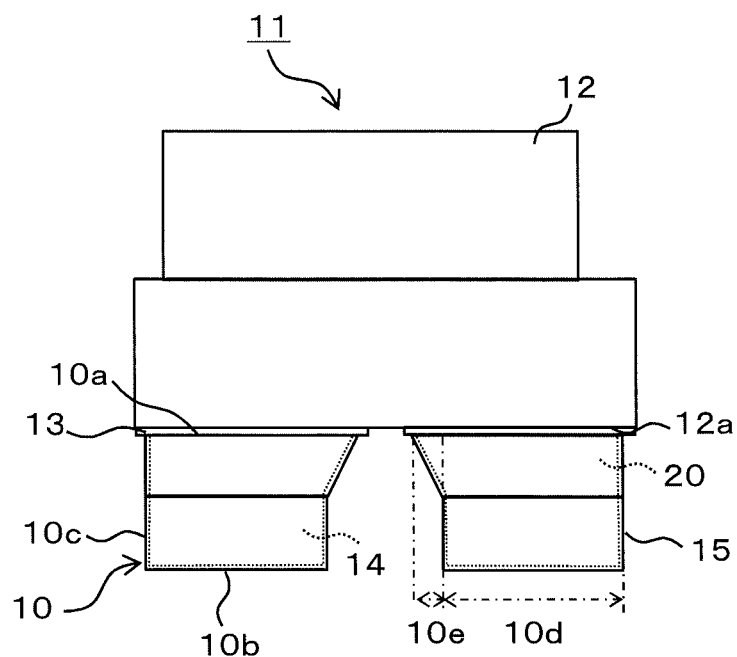
FIG. 4A is a schematic side view showing an aircraft including landing gears of an aircraft according to Embodiment 2 of the present invention.
Figure 4B:
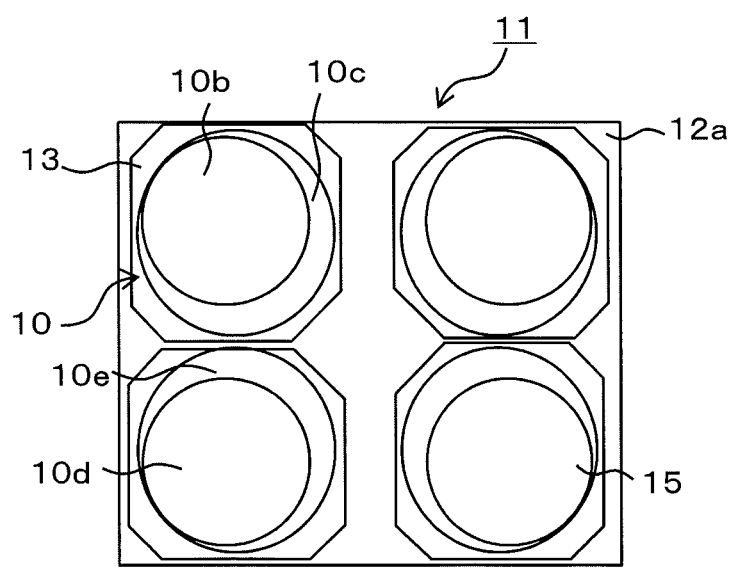
FIG. 4B is a bottom view of the aircraft of FIG. 4A.

The configuration of the aircraft 11 including the landing gears 10 of the aircraft 11 according to Embodiment 2 will be described with reference to FIGS. 4A and 4B. The aircraft 11 includes the body 12 and the landing gears 10. Each of the landing gears 10 includes the first core section 14, and a second core section 20 placed on the first core top surface 14a of the first core section 14. The first core bottom surface 14b of the first core section 14 constitutes the gear bottom surface 10b of each of the landing gears 10. A top surface (second core top surface) 20a of the second core section 20 constitutes the gear top surface 10a of each of the landing gears 10. Each of the landing gears 10 is mounted on the aircraft 11 by a bracket 13 or the like disposed between the second core top surface 20a and the body bottom surface 12a.

The first core section 14 has a circular cylindrical shape. The second core section 20 has a circular truncated cone shape (frustum of circular cone). The shape of the first core section 14 is not limited to the circular cylinder and may be a rectangular cylinder. The shape of the second core section 20 is not limited to the circular truncated cone, and may be a truncated frustum such as a truncated pyramid (frustum of pyramid).

In the second core section 20, a portion of a side surface (second core side surface) 20c on a corner side of the body bottom surface 12a extends vertically upward from a second core bottom surface 20b. In contrast, the remaining portion of the second core side surface 20c which is other than the portion on the corner side of the body bottom surface 12a is inclined with respect to the second core bottom surface 20b in such a manner that the cross-sectional area of the second core section 20 increases from the second core bottom surface 20b toward the second core top surface 20a.

The second core section 20 includes a portion with a circular cylinder shape (second core body section) 20e between the second core bottom surface 20b and the second core top surface 20a, and a portion (second core support section) 20f between the second core side surface 20c and the second core top surface 20a. The second core support section 20f is adjacent to another second core support section 20f (located on the inner side of the airframe).

Figure 5:
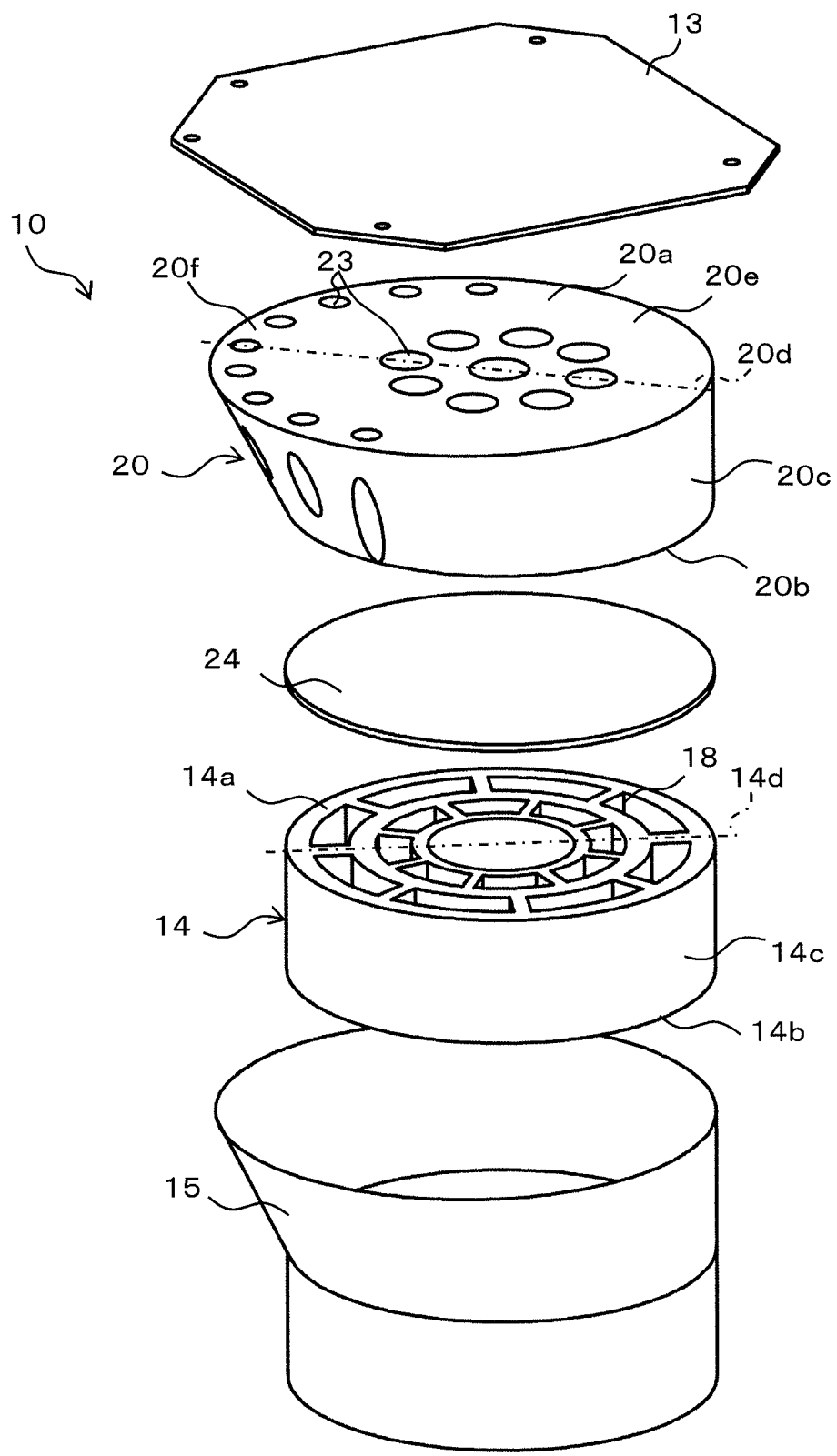
FIG. 5 is an exploded perspective view of the landing gear.
Figure 6A:
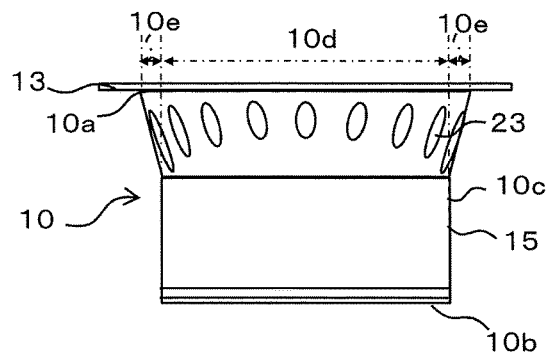
FIG. 6A is a side view of the landing gear which is viewed from a side surface on a second symmetricity axis.
Figure 6B:
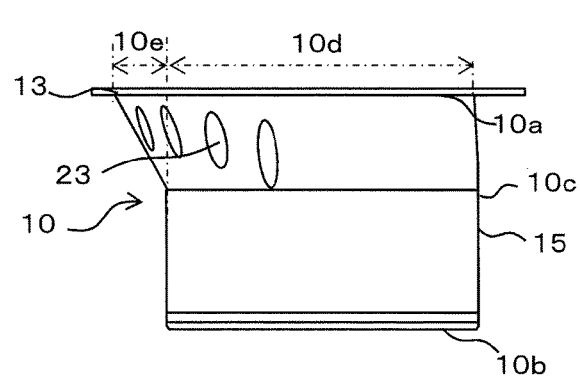
FIG. 6B is a side view of the landing gear which is viewed from a side surface in a direction perpendicular to the second symmetricity axis.
Figure 6C:
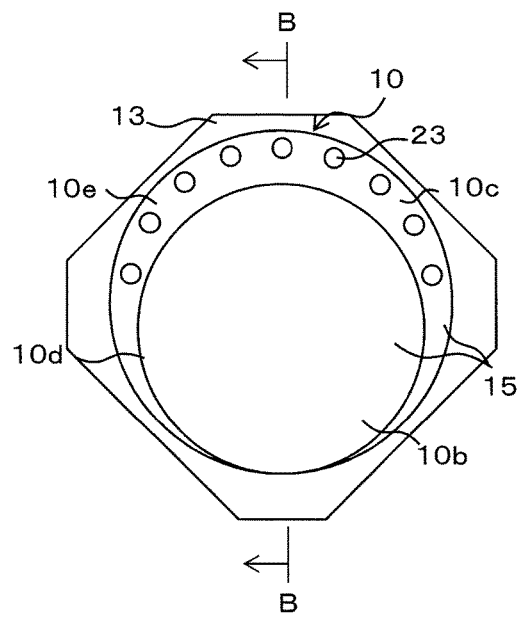
FIG. 6C is a bottom view of the landing gear.
Figure 6D:
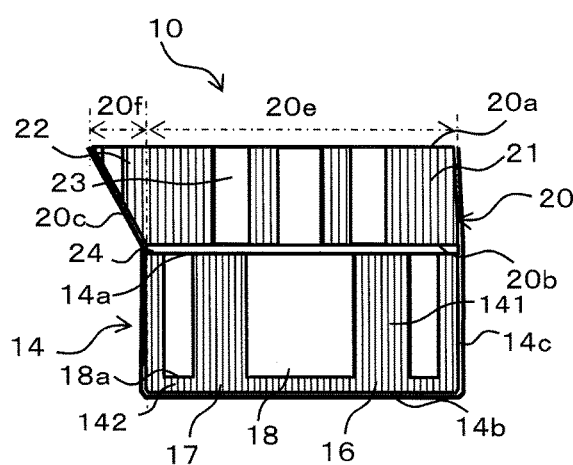
FIG. 6D is a cross-sectional view taken along line B-B of FIG. 6C.

Next, the constituents of each of the landing gears 10 will be described with reference to FIGS. 5 to 6D. As shown in FIG. 5, each of the landing gears 10 includes the first core section 14, the second core section 20, a plate section 24, and the cover section 15.

The first core section 14 includes a number of first cell walls 16 and a plurality of first cell holes 17, and has a honeycomb structure. The first core section 14 is provided with one or a plurality of (16 in the present embodiment) first holes 18. The first core section 14 includes the core body 141 provided with the first holes 18, and the core bottom section 142. The core bottom section 142 is provided between the first hole bottom surfaces 18a and the first core bottom surface 14b. The first cell walls 16 may be uniformly disposed in the whole of the first core bottom surface 14b. In this case, a force is uniformly applied to the first cell walls 16 in the first core bottom surface 14b during landing of each of the landing gears 10. A load applied to the aircraft 11 is suppressed as a whole by the first cell walls 16. As a result, break or fracture of the aircraft 11 can be prevented.

The second core section 20 includes a number of cell walls (second cell walls) 21 and a plurality of cell holes (second cell holes) 22, and has a honeycomb structure. The second cell walls 21 are similar to the first cell walls 16. The second cell holes 22 are similar to the first cell holes 17. Therefore, detailed description of the second cell walls 21 and the second cell holes 22 is omitted.

The second core top surface 20a and the second core bottom surface 20b of the second core section 20 have, for example, a circular shape. The second core top surface 20a is connected to the bracket 13. Each of the landing gears 10 is fastened to the body bottom surface 12a of the aircraft 11 by the bracket 13. The second core bottom surface 20b has an area equal to that of the first core top surface 14a. The second core top surface 20a has an area larger than that of the second core bottom surface 20b.

The cross-section of the second core section 20 which is taken in the direction perpendicular to the extending direction of the second cell holes 22 has, for example, a circular shape. The cross-sectional area of the second core section 20 increases along the extending direction of the second cell holes 22. A portion (second portion) of the second core side surface 20c including a second core symmetry line 20d extends upward in a direction that is perpendicular or substantially perpendicular to the second core bottom surface 20b. The remaining portion of the second core side surface 20c which is other than the second portion is inclined with respect to the second core bottom surface 20b. In this way, the second core section 20 includes a portion (second core body section) 20e between the second core bottom surface 20b and the second core top surface 20a, and a portion (second core support section) 20f between the second core side surface 20c and the second core top surface 20a. The second core body section 20e and the first core body section 14e constitute the gear body section 10d of each of the landing gears 10. The second core support section 20f is provided to surround the second core body section 20e except the first portion, and constitutes the gear support section 10e of each of the landing gears 10.

One or a plurality of (18 in the present embodiment) holes (second holes) 23 is/are provided in the second core section 20. The plurality of second holes 23 may be line-symmetrically arranged with respect to the second core symmetry line 20d. The plurality of second holes 23 extend from the second core top surface 20a toward the second core bottom surface 20b. For example, the plurality of second holes 23 extend in parallel with the second cell holes 22 along the extending direction of the second cell holes 22. The plurality of second holes 23 may penetrate the second core section 20, between the second core side surface 20c and the second core top surface 20a, and between the second core bottom surface 20b and the second core top surface 20a.

The plate section 24 has, for example, a flat disc shape. The plate section 24 has a diameter equal to that of the first core top surface 14a and that of the second core bottom surface 20b. The plate section 24 is placed between the first core section 14 and the second core section 20. The plate section 24 is fastened to the first cell walls 16 of the first core section 14 and the second cell walls 21 of the second core section 20. The plate section 24 is made of a material with a light weight and high strength, for example, a resin such as a carbon fiber reinforced plastic.

The cover section 15 covers the first core section 14 and the second core section 20. The cover section 15 covers the first core side surface 14c and the second core side surface 20c to protect the first core section 14 and the second core section 20. The cover section 15 also covers the second core bottom surface 20b to prevent ingress of dirt or the like into the second core section 20.

In accordance with the above-described configuration, the plate section 24 is interposed between the first core section 14 and the second core section 20. In this configuration, when the aircraft 11 lands on the landing point (place) 19 which is hard, a collision load acts on the first core section 14, is transmitted toward the aircraft 11 via the first cell walls 16, and reaches the plate section 24. The transmitted force of the load is dispersed in the extending direction of the plate section 24. In this way, the force directed toward the aircraft 11 is transmitted to the second core section 20 in a state in which the force is made uniform in the extending direction of the plate section 24, and reaches the aircraft 11 through the second cell plate. Since the force (pressure) acting on the aircraft 11 is made uniform and small, break or fracture of the aircraft 11 can be prevented.

In a case where the aircraft 11 lands in a tilted state on the landing point 19 which is hard, a collision load which is oblique with respect to the extending direction of the first cell holes 17 acts on the first core section 14. To bear the shearing force and the bending moment, the plate section 24 joined to the first core section 14 and the second core section 20 supports and reinforces the first cell walls 16 and the second cell walls 21. Therefore, break or fracture of each of the landing gears 10 can be suppressed.

The second core section 20 is interposed between the plate section 24 and the bracket 13. These constituents form a honeycomb-sandwich structure. With this structure, it becomes possible to realize the landing gear 10 which has a high resistance to tension and compression, and a high bending rigidity, and is lightweight.

Each of the landing gears 10 includes the second core section 20 in addition to the first core section 14. With this structure, the length in the vertical direction of each of the landing gears 10 between the gear bottom surface 10b and the gear top surface 10a can be increased.

The cross-sectional area of the second core section 20 which is taken in the direction perpendicular to the extending direction of the second cell holes 22 increases from the second core bottom surface 20b toward the second core top surface 20a. With this shape, even in a case where the bending moment and the shearing force due to an oblique load acts on each of the landing gears 10, the second core support section 20f can prevent break or fracture of each of the landing gears 10.

Since the first core section 14, the plate section 24, and the second core section 20 are covered by the cover section 15, the configuration of each of the landing gears 10 is simple. Since the first core section 14 and the second core section 20 have the honeycomb structure, the first core section 14 is provided with the first holes 18, and the second core section 20 is provided with the second holes 23, the weight of each of the landing gears 10 can be reduced. Further, since the first holes 18 are provided in the first core section 14, the aircraft 11 can land on the landing point 19 irrespective of a state of the landing point 19.

Other Embodiments

In Embodiment 2 described above, the second core section 20 has the honeycomb structure including the second cell walls 21 and the second cell holes 22. However, the structure of the second core section 20 is not limited to this so long as the second core section 20 is lightweight, and is high in the shearing force and the bending moment in the direction parallel to the second core top surface 20a or the second core bottom surface 20b, and a compressive force in the direction perpendicular to the second core top surface 20a or the second core bottom surface 20b. For example, the second core section 20 may be a casing or a rod member.

Figure 7A:
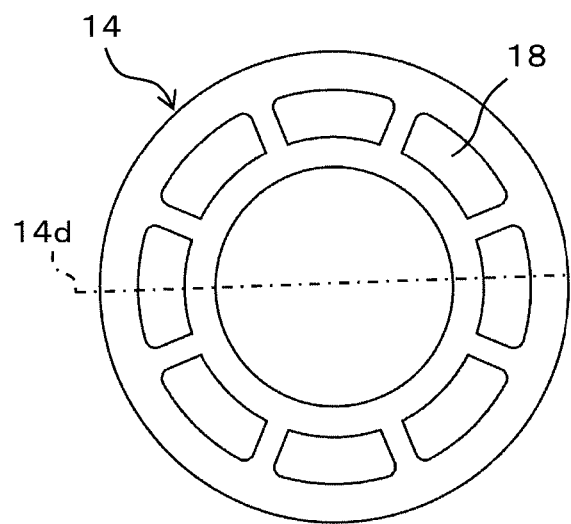
FIGS. 7A and 7B are bottom views showing first core sections of landing gears according to other embodiments of the present invention.
Figure 7B:
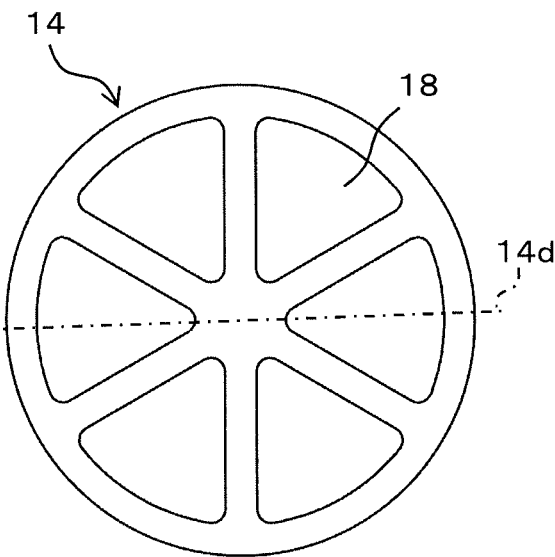

In Embodiment 2 described above, as shown in FIG. 5, the first core section 14 is provided with one first hole 18 located at the center thereof, eight first holes 18 arranged to surround the one first hole 18, and eight first holes 18 arranged to surround the eight first holes 18. The number and layout of the first holes 18 in the first core section 14 are not limited to this. For example, as shown in FIG. 7A, the first core section 14 may be provided with one first hole 18 located at the center thereof, and eight first holes 18 arranged to surround the one first hole 18. Further, as shown in FIG. 7B, the first core section 14 may be provided with six first holes 18 with a sector shape which are arranged to form a circle with a center of the first core section 14.

Although in the above-described embodiments, the first core section 14 includes the core body 141 and the core bottom section 142. However, the first core section 14 may include only the core body 141 without the core bottom section 142. In this case, the first holes 18 penetrate the first core body 141 between the first core bottom surface 14b and the first core top surface 14a.

A landing gear of an aircraft and the aircraft comprising the landing gear of the present invention are useful as, for example, a landing gear of an aircraft, having a simple and lightweight structure which allows the landing gear to more reliably land on a landing point (place), irrespective of a state of the landing point, and the aircraft comprising the landing gear.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

What is claimed is:

1. A landing gear of an aircraft, the landing gear comprising:
   a core section with a honeycomb structure, including a plurality of cell walls and a plurality of cell holes defined by the plurality of cell walls;
   a cover section which covers the core section; and
   a hole provided in the core section to absorb an impact, the hole having a diameter larger than that of one of the plurality of cell holes and extending in an extending direction of the plurality of cell holes,
   wherein the core section has a shape in which a cross-sectional area in a direction perpendicular to the extending direction of the plurality of cell holes increases from a bottom surface of the core section toward a top surface of the core section.

2. A landing gear of an aircraft, the landing gear comprising:

a first core section with a honeycomb structure, including a plurality of cell walls and a plurality of cell holes defined by the plurality of cell walls;

a second core section placed on a top surface of the first core section;

a plate section interposed between the first core section and the second core section;

a cover section which covers the first core section, the plate section, and the second core section; and a hole provided in the first core section to absorb an impact, the hole having a diameter larger than that of one of the plurality of cell holes and extending in an extending direction of the plurality of cell holes.

3. The landing gear of the aircraft according to claim 2, wherein the plurality of cell walls are a plurality of first cell walls, and the plurality of cell holes are a plurality of first cell holes, and wherein the second core section has a honeycomb structure, including a plurality of second cell walls and a plurality of second cell holes defined by the plurality of second cell walls.

4. The landing gear of the aircraft according to claim 3, wherein the hole is a first hole, and wherein the second core section includes a second hole extending between a top surface of the second core section and a bottom surface of the second core section.

5. The landing gear of the aircraft according to claim 3, wherein the second core section has a shape in which a cross-sectional area in a direction perpendicular to an extending direction of the plurality of second cell holes increases from the bottom surface of the second core section toward the top surface of the second core section.

6. An aircraft comprising the landing gear as recited in claim 1.

7. An aircraft comprising:

the landing gear as recited in claim 3; and a bracket provided in such a manner that the second core section is interposed between the bracket and the plate section, wherein the plate section, the second core section, and the bracket constitute a honeycomb sandwich structure.

8. The landing gear of the aircraft according to claim 1, wherein the cover section is made of a resin.

9. An aircraft comprising the landing gear as recited in claim 2.

10. The landing gear of the aircraft according to claim 2, wherein the cover section is made of a resin.

* * * * *